(12) United States Patent
Kim et al.

(10) Patent No.: US 12,487,952 B2
(45) Date of Patent: Dec. 2, 2025

(54) METHOD AND SYSTEM FOR SHIFTING DATA WITHIN MEMORY

(71) Applicant: REBELLIONS INC., Seongnam-si (KR)

(72) Inventors: Hyunho Kim, Seongnam-si (KR); Sangeun Je, Seongnam-si (KR); Jaewan Bae, Seongnam-si (KR)

(73) Assignee: REBELLIONS INC., Seongnam-si (KR)

( * ) Notice: Subject to any disclaimer, the term of this patent is extended or adjusted under 35 U.S.C. 154(b) by 0 days.

(21) Appl. No.: 18/936,668

(22) Filed: Nov. 4, 2024

(65) Prior Publication Data

US 2025/0335376 A1 Oct. 30, 2025

(30) Foreign Application Priority Data

Apr. 29, 2024 (KR) .................. 10-2024-0056762

(51) Int. Cl.
*G06F 13/18* (2006.01)
*G06F 13/16* (2006.01)
*G06F 13/28* (2006.01)

(52) U.S. Cl.
CPC .......... *G06F 13/18* (2013.01); *G06F 13/1668* (2013.01); *G06F 13/28* (2013.01)

(58) Field of Classification Search
CPC ....................................................... G06F 13/18
USPC ........................................................ 711/154
See application file for complete search history.

(56) References Cited

U.S. PATENT DOCUMENTS

| | | | | |
|---|---|---|---|---|
| 5,283,883 | A * | 2/1994 | Mishler | G06F 13/28 710/33 |
| 5,426,737 | A * | 6/1995 | Jacobs | G06F 13/128 710/27 |
| 8,392,662 | B2 | 3/2013 | Jang et al. | |
| 9,032,104 | B2 * | 5/2015 | Simon | G06F 13/30 710/22 |
| 10,185,676 | B2 | 1/2019 | Kwon et al. | |
| 11,455,249 | B2 | 9/2022 | Lee | |
| 11,977,735 | B2 | 5/2024 | Cha | |

(Continued)

FOREIGN PATENT DOCUMENTS

| | | |
|---|---|---|
| KR | 10-2009-0131146 A | 12/2009 |
| KR | 10-2015-0095139 A | 8/2015 |

(Continued)

*Primary Examiner* — Titus Wong
(74) *Attorney, Agent, or Firm* — BROADVIEW IP LAW, PC

(57) ABSTRACT

Provided is a method for shifting data within a memory, which is performed by a direct memory access (DMA) controller, and which includes receiving a task associated with an operation of shifting target data stored in a first area of a memory connected to the DMA controller to a second area of the memory, receiving the target data from the memory, determining a priority of each of a plurality of data items divided from the target data based on an address of the first area and an address of the second area, generating a plurality of write requests corresponding to the plurality of data items, and transmitting the plurality of generated write requests sequentially to a memory controller associated with the memory, so that the plurality of data items are stored in the second area in sequence according to the determined priority.

18 Claims, 12 Drawing Sheets

(56) References Cited

U.S. PATENT DOCUMENTS

| | | | | |
|---|---|---|---|---|
| 2003/0115403 | A1* | 6/2003 | Bouchard | G06F 13/1647 |
| | | | | 711/154 |
| 2006/0190640 | A1* | 8/2006 | Yoda | G06F 13/364 |
| | | | | 710/52 |
| 2007/0204073 | A1* | 8/2007 | Chen | G06F 13/28 |
| | | | | 710/22 |
| 2008/0183882 | A1* | 7/2008 | Flynn | G06F 3/065 |
| | | | | 711/E12.04 |
| 2011/0131351 | A1* | 6/2011 | Noeldner | G06F 3/0601 |
| | | | | 710/52 |
| 2014/0173208 | A1* | 6/2014 | Cho | G06F 12/0897 |
| | | | | 711/122 |
| 2018/0052789 | A1* | 2/2018 | Chen | G06F 9/5038 |
| 2018/0373656 | A1* | 12/2018 | Kuwabara | G06F 13/28 |
| 2019/0121761 | A1* | 4/2019 | Yuenyongsgool | G06F 13/28 |
| 2019/0196996 | A1* | 6/2019 | Balakrishnan | G06F 13/30 |
| 2019/0243570 | A1* | 8/2019 | Mittal | G06F 3/0649 |
| 2020/0050366 | A1* | 2/2020 | Bavishi | G06F 3/0656 |
| 2020/0133730 | A1* | 4/2020 | Ingram | G06F 9/5038 |
| 2020/0210122 | A1* | 7/2020 | Nakamura | G06F 13/1673 |
| 2020/0380116 | A1* | 12/2020 | Gentili | G06F 21/74 |
| 2020/0401540 | A1* | 12/2020 | Birsan | G06F 13/28 |
| 2020/0411081 | A1* | 12/2020 | Hiscock | G11C 5/025 |
| 2022/0229595 | A1 | 7/2022 | Lee et al. | |

FOREIGN PATENT DOCUMENTS

| | | |
|---|---|---|
| KR | 10-2021-0020694 A | 2/2021 |
| KR | 10-2021-0138996 A | 11/2021 |
| KR | 10-2022-0105285 A | 7/2022 |

* cited by examiner

METHOD AND SYSTEM FOR SHIFTING DATA WITHIN MEMORY

CROSS-REFERENCE TO RELATED APPLICATION

This application claims priority to Korean Patent Application No. 10-2024-0056762, filed in the Korean Intellectual Property Office on Apr. 29, 2024, the entire contents of which are hereby incorporated by reference.

BACKGROUND

Field

This disclosure relates to a method and a system for shifting data within a memory, and specifically, to a method and a system for determining a priority of each of a plurality of data items divided from target data to be shifted, and transmitting a plurality of write requests corresponding to the plurality of data items sequentially to a memory controller according to the determined priority.

Description of Related Art

Direct memory access (DMA) controllers can minimize operation at a host (e.g., CPU) to control data input and output to a memory and can directly control data access and shifting.

Meanwhile, data stored in the memory may be shifted within the memory. If the source and destination areas overlap each other during data shifting within the memory, there is a concern of data corruption. The method of storing data to be shifted using a separate memory device and then transmitting it back to the memory to prevent data corruption may unnecessarily consume additional bandwidth of the separate memory device.

Therefore, there is a need for the introduction of a new method and memory system for shifting data, which prevent data corruption problems without unnecessarily consuming the bandwidth of a separate memory device.

SUMMARY

In order to solve one or more problems (e.g., the problems described above and/or other problems not explicitly described herein), the present disclosure provides a method and a system for shifting data within a memory.

The present disclosure may be implemented in a variety of ways, including methods, devices (systems) and/or computer programs stored in computer readable storage media.

According to some aspects of the disclosure, a method for shifting data within a memory may be performed by a direct memory access (DMA) controller and may include receiving a task associated with an operation of shifting target data stored in a first area of a memory connected to the DMA controller to a second area of the memory, receiving the target data from the memory, determining a priority of each of a plurality of data items divided from the target data based on an address of the first area (source area) and an address of the second area (destination area), generating a plurality of write requests corresponding to the plurality of data items, and transmitting the plurality of generated write requests sequentially to a memory controller associated with the memory, so that the plurality of data items are stored in the second area in sequence according to the determined priority.

The memory controller may be configured to, in response to sequentially receiving the plurality of write requests from the DMA controller, sequentially store a plurality of data items corresponding to the plurality of write requests in the second area.

The generating the plurality of write requests may include sequentially generating the plurality of write requests according to the determined priority.

The plurality of data items may include a first data item and a second data item having a lower priority than the first data item, the plurality of write requests may include a first write request corresponding to the first data item and a second write request corresponding to the second data item, and the generating the plurality of write requests may include in response to receiving the second data item before receiving the first data item, withholding the generation of the second write request, and in response to transmitting all write requests associated with a data item having a higher priority than the first data item to the memory controller and receiving the first data item, generating the first write request.

The determining the priority may include, in response to at least a portion of the first area and at least a portion of the second area overlapping with each other, determining the priority.

Each of the plurality of data items may be stored in each of a plurality of sub-areas in the first area, and The determining the priority may include, in response to an address of the second area being higher than an address of the first area, assigning a higher priority to a data item stored in a sub-area of a higher address of the plurality of sub-areas.

Each of the plurality of data items may be stored in each of a plurality of sub-areas in the first area, and the determining the priority may include, in response to an address of the second area being lower than an address of the first area, assigning a higher priority to a data item stored in a sub-area of a lower address of the plurality of sub-areas.

The generating the plurality of write requests may include calculating address information of a plurality of sub-areas in the second area where the plurality of data items are to be stored, and each of the plurality of write requests may include address information of each of the plurality of sub-areas.

The transmitting the plurality of write requests may include transmitting each of the plurality of write requests to the memory controller in response to the first condition or the second condition being satisfied, and the first condition may be that a read of an area where a data item corresponding to each of the plurality of write requests is to be stored is completed, and the second condition may be that the area where the data item corresponding to each of the plurality of write requests is to be stored does not overlap with the first area (source area).

The receiving the target data may include generating a plurality of read requests associated with the plurality of data items, transmitting the plurality of generated read requests to the memory controller, and receiving the plurality of data items corresponding to the plurality of read requests from the memory controller.

The transmitting the plurality of read requests may include sequentially transmitting the plurality of generated read requests to the memory controller, so that the plurality of data items are read from the first area according to the determined priority, and the receiving the plurality of data items may include receiving the plurality of data items in sequence according to the determined priority.

The receiving the plurality of data items may include receiving the plurality of data items in sequence independent of the priority of each of the plurality of data items.

The generating the plurality of read requests may include generating the plurality of read requests in sequence according to the determined priority.

The generating the plurality of read requests may include calculating address information of a plurality of sub-areas in the first area where the plurality of data items are stored, and each of the plurality of read requests may include address information of each of the plurality of sub-areas.

According to aspects of the present disclosure, a memory system may include a direct memory access (DMA) controller, and a memory connected to the DMA controller and a memory controller associated with the memory, the DMA controller may be configured to receive a task associated with an operation of shifting a target data stored in a first area of the memory to a second area of the memory, receive the target data from the memory, determine a priority of each of a plurality of data items divided from the target data based on an address of the first area and an address of the second area, generate a plurality of write requests corresponding to the plurality of data items, and transmit the plurality of generated write requests sequentially to the memory controller, so that the plurality of data items are stored in the second area in sequence according to the determined priority.

The DMA controller may be configured to, in response to at least a portion of the first area and at least a portion of the second area overlapping with each other, determine the priority.

The DMA controller may be configured to, in response to an address of the second area being higher than an address of the first area, assign a higher priority to a data item stored in a sub-area of a higher address of the plurality of sub-areas.

The DMA controller may be configured to, in response to the address of the second area being lower than the address of the first area, assign a higher priority to a data item stored in a sub-area of a lower address of the plurality of sub-areas.

The DMA controller may be configured to transmit each of the plurality of write requests to the memory controller in response to the first condition or the second condition being satisfied, the first condition may be that a read of an area where a data item corresponding to each of the plurality of write requests is to be stored is completed, and the second condition may be that the area where the data item corresponding to each of the plurality of write requests is to be stored does not overlap with the first area.

According to some aspects of the present disclosure, by sequentially storing a plurality of data items corresponding to a plurality of write requests in a destination area of a memory according to the priority, corruption of data stored in the memory can be prevented when data is shifted within the memory.

According to some aspects of the present disclosure, by performing read and write operations of the target data in parallel, efficiency of data shifting within the memory can be increased.

According to some aspects of the present disclosure, by writing the corresponding data chunk group in the destination area in response to completing reception of each data chunk group, data corruption caused by data shifting can be prevented.

The effects of the present disclosure are not limited to the effects described above, and other effects not described herein can be clearly understood by those of ordinary skill in the art (referred to as "ordinary technician") from the description of the claims.

BRIEF DESCRIPTION OF THE DRAWINGS

Aspects of the present disclosure will be described with reference to the accompanying drawings described below, where similar reference numerals indicate similar elements, although the aspects are not limited thereto, in which.

DETAILED DESCRIPTION

Figure 1:
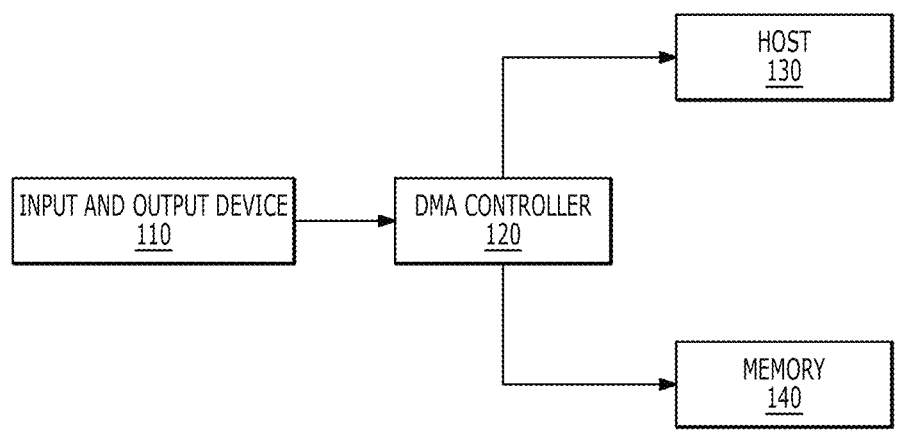
FIG. 1 is a diagram provided to explain an operation of a direct memory access (DMA) controller.

Specific details for implementing the present disclosure will be described in detail with reference to the accompanying drawings. However, in the following description, detailed description of well-known functions or configurations will be omitted when it may make the subject matter of the present disclosure rather unclear.

In the accompanying drawings, the same or corresponding components are assigned the same reference numerals. In addition, in the following description of various examples, duplicate descriptions of the same or corresponding components may be omitted. However, even if descriptions of components are omitted, it is not intended that such components are not included in any example.

Advantages and features of the disclosed examples and methods of accomplishing the same will be apparent by referring to examples described below in connection with the accompanying drawings. However, the present disclosure is not limited to the examples disclosed below, and may be implemented in various forms different from each other, and the examples are merely provided to make the present disclosure complete, and to fully disclose the scope of the disclosure to those skilled in the art to which the present disclosure pertains.

The terms used herein will be briefly described prior to describing the disclosed example(s) in detail. The terms used herein have been selected as general terms which are widely used at present in consideration of the functions of the present disclosure, and these terms may be altered according to the intent of a person skilled in the art, related practice, or introduction of new technology. In addition, in specific cases, certain terms may be arbitrarily selected by the applicant, and the meaning of the terms will be described in detail in a corresponding description of the invention. Therefore, the terms used in the present disclosure should be defined based on the meaning of the terms and the overall content of the present disclosure rather than a simple name of each of the terms.

The singular forms "a," "an," and "the" as used herein are intended to include the plural forms as well, unless the context clearly indicates the singular forms. Further, the plural forms are intended to include the singular forms as well, unless the context clearly indicates the plural forms. Further, throughout the description, when a portion is stated as "comprising (including)" a component, it is intended to mean that the portion may additionally comprise (or include or have) another component, rather than excluding the same, unless specified to the contrary.

Further, the term "module" or "unit" used herein refers to a software or hardware component, and "module" or "unit" performs certain roles. However, the meaning of the "module" or "unit" is not limited to software or hardware. The "module" or "unit" may be configured to be in an addressable storage medium or configured to execute at least one processor. Accordingly, as an example, the "module" or "unit" may include components such as software components, object-oriented software components, class components, and task components, and at least one of processes, functions, attributes, procedures, subroutines, program code segments, drivers, firmware, micro-code, circuits, data, database, data structures, tables, arrays, and variables. Furthermore, functions provided in the components and the "modules" or "units" may be combined into a smaller number of components and "modules" or "units", or further divided into additional components and "modules" or "units."

The "module" or "unit" may be implemented as a processor and a memory, or may be implemented as a circuit (circuitry). Terms such as "circuit (or circuitry)" may refer to a circuit in hardware, but may also refer to a circuit in software. The "processor" should be interpreted broadly to encompass a general-purpose processor, a central processing unit (CPU), a microprocessor, a digital signal processor (DSP), a controller, a microcontroller, a state machine, etc. Under some circumstances, the "processor" may refer to an application-specific integrated circuit (ASIC), a programmable logic device (PLD), a field-programmable gate array (FPGA), etc. The "processor" may refer to a combination of processing devices, e.g., a combination of a DSP and a microprocessor, a combination of a plurality of microprocessors, a combination of one or more microprocessors in conjunction with a DSP core, or any other combination of such configurations. In addition, the "memory" should be interpreted broadly to encompass any electronic component that is capable of storing electronic information. The "memory" may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. The memory is said to be in electronic communication with a processor if the processor can read information from and/or write information to the memory. The memory integrated with the processor is in electronic communication with the processor.

In addition, terms such as first, second, A, B, (a), (b), etc. used in the following examples are only used to distinguish certain components from other components, and the nature, sequence, order, etc. of the corresponding components are not limited by the terms.

In addition, in the following examples, if a certain component is stated as being "connected," "combined" or "coupled" to another component, it is to be understood that there may be yet another intervening component "connected," "combined" or "coupled" between the two components, although the two components may also be directly connected or coupled to each other.

In addition, as used in the following examples, "comprise" and/or "comprising" does not foreclose the presence or addition of one or more other elements, steps, operations, and/or devices in addition to the recited elements, steps, operations, or devices.

In the present disclosure, "each of a plurality of A" may refer to each of all components included in the plurality of A, or may refer to each of some of the components included in the plurality of A.

Before describing various examples of the present disclosure, terms used herein will be explained.

In the present disclosure, an "address" may refer to a unique identifier indicating a position where data or information is stored. The "address" may include a physical address of hardware, a logical address or a virtual address used in an application or an operating system, etc. The "address" may refer to an address range in which specific data or information is positioned, or may refer to a start address of the address range in which the corresponding data or information is positioned.

In the present disclosure, a "high address" may refer to an address far from the starting point of a specific memory space, and a "low address" may refer to an address close to the starting point of the specific memory space. For example, in a memory system with memory addresses in the range of 0x0000 to 0xFFFF, the address may be higher as it approaches 0xFFFF and lower as it approaches 0x0000.

In the present disclosure, "target data" may refer to data to be shifted within the memory. The target data is not necessarily stored in one continuous memory space. For example, the target data may be divided and stored in a plurality of areas in the memory, and a specific area in the memory where the target data is stored may include a plurality of areas. Throughout the description and drawings, it may be described and illustrated that the target data is stored in one continuous area in the memory, but it should be understood that this is for convenience of explanation, and that description and illustration of an area or space in the memory where data other than the target data is stored may be omitted.

In the present disclosure, the "source area" may refer to a specific area on the memory where the target data is stored before the operation of shifting the target data starts, and the "destination area" may refer to a specific area on the memory where the target data is stored after the operation of shifting the target data is completed.

In the present disclosure, a "task" may refer to a task descriptor that expresses attribute information of a task in some applications. For example, receiving a task associated with the operation of shifting the target data may be used in the same sense as receiving a task descriptor including information of the source area and information of the destination area.

In the present disclosure, the terms "move", "shift" and "transfer" may be used interchangeably. For example, shifting certain data from a first region in memory to a second region in memory may have the same meaning as transferring or moving certain data from a first region in memory to a second region in memory.

Hereinafter, various examples of the present disclosure will be described in detail with reference to the accompanying drawings.

FIG. 1 is a diagram provided to explain an operation of a direct memory access (DMA) controller 120. The DMA controller 120 may control data transfer without involving data input and output control of a host 130 (e.g., CPU). For example, if data transmission is required, an input and output device 110 may request data transmission from the DMA controller 120, and the DMA controller 120 may directly manage data transmission between the input and output device 110 and a memory 140 in response to the host 130 allowing data transmission.

In response to receiving a task associated with data shifting (or, data transfer) within the memory 140, the DMA controller 120 may shift (or, transfer) the target data stored in a specific area of the memory 140 to another area in the memory 140.

The DMA controller 120 may receive the target data stored in the specific area of the memory 140 from the memory 140 or a memory controller (not illustrated) associated with the memory 140, and store the received target data in another area of the memory 140 through one or more connection channels.

The DMA controller 120 may include a management controller that performs an operation of receiving and distributing tasks, and one or more channel controllers that shift the target data by performing the tasks distributed from the management controller. Detailed configurations of the DMA controller 120 and the operation of each of the configurations will be described in detail with reference to FIGS. 5, 8 and 9, etc.

Figure 2:
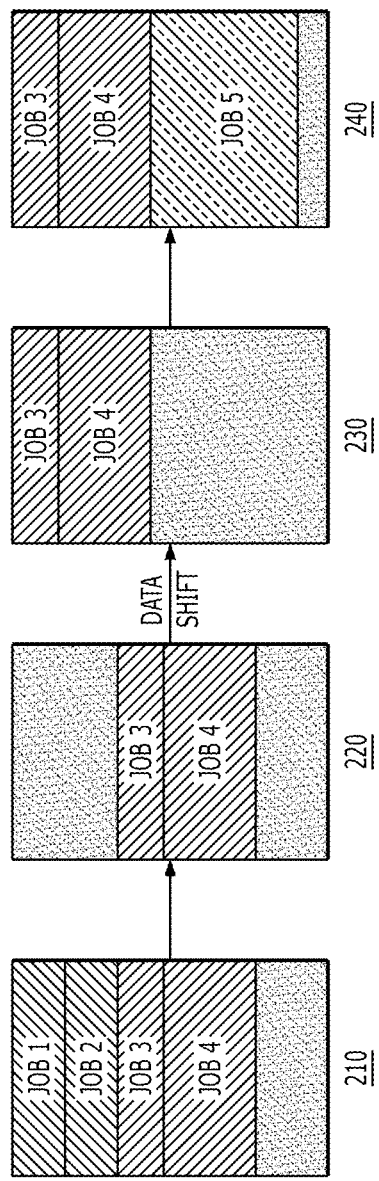
FIG. 2 is a diagram illustrating an example of performing an operation of shifting data within a memory.

FIG. 2 is a diagram illustrating an example of performing an operation of shifting (or, operation of transferring) data within the memory. The boxes illustrated in FIG. 2 represent spaces in the memory (e.g., the memory 140 of FIG. 1), and each of the blocks in the boxes may represent output data of a specific job ("Job") stored in a specific space in the memory. In FIG. 2, it is assumed that Job 1 and Job 2 are performed and then Job 3 is performed dependently (or, subsequently), and that Job 3 and Job 4 are performed and then Job 5 is performed dependently (or, subsequently).

A first operation 210 represents an example in which output data of Job 1 to Job 4 is stored in the memory. As Job 3 is performed based on Job 1 and Job 2, in the second operation 220, the space where the output data of Job 1 and Job 2 was stored in the first operation 210 is shown as an available space.

The data in the memory may be shifted in a third operation 230 so that output data of Job 5 based on Job 3 and Job 4 is stored in the memory. The output data of Job 5 may be stored in a fourth operation 240.

As illustrated in FIG. 2, a source area where the data to be shifted in the second operation 220 is stored, and a destination area where the data is stored in the third operation 230 may overlap each other. The data in the memory of the second operation 220 may be transmitted from the memory of FIG. 2 to a separate memory device (e.g., DRAM), and transmitted back to the memory of FIG. 2 to be stored in the destination area of the third operation 230, such that data corruption problems caused by the data shifting may be avoided. However, there is a problem that the bandwidth of the separate memory device is unnecessarily consumed, and there are limitations which will be described later with reference to FIGS. 3 and 4.

Figure 3:
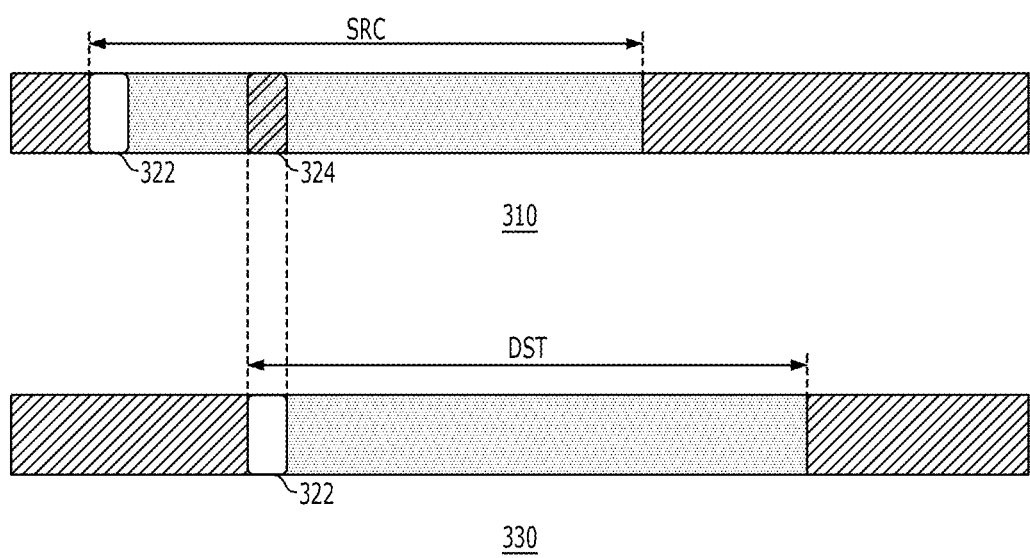
FIG. 3 is a diagram illustrating an example of data corruption occurring during data shifting within a memory.
Figure 4:
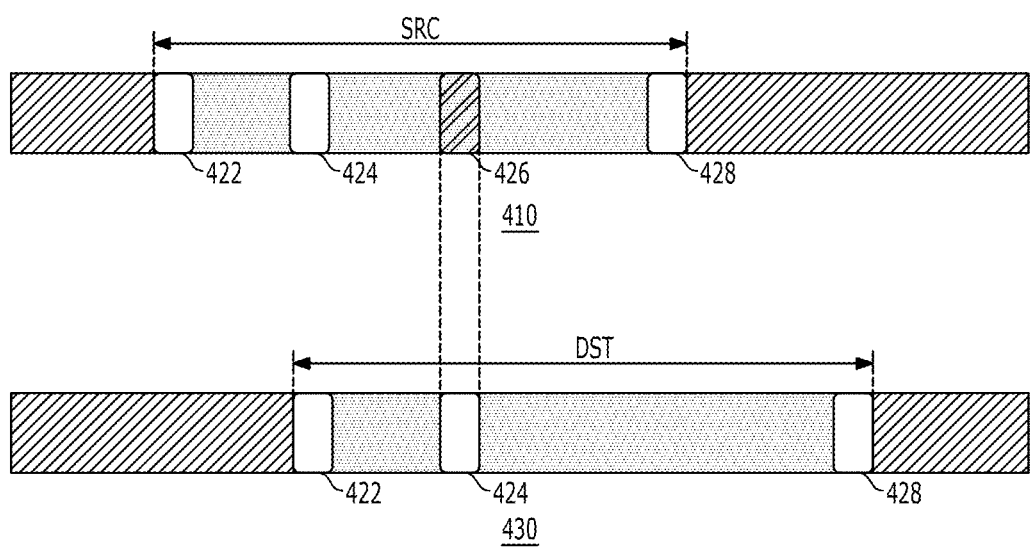
FIG. 4 is a diagram illustrating another example of data corruption occurring during data shifting within a memory.

FIG. 3 is a diagram illustrating an example of data corruption occurring during data shifting within the memory. FIG. 4 is a diagram illustrating another example of data corruption occurring during data shifting within the memory. The first operations 310 and 410 of FIGS. 3 and 4 represent examples in which the target data is stored in a source area "src" of the memory before the target data is shifted, and the second operations 330 and 430 represent examples in which the target data is stored in a destination area "dst" of the memory after the target data is shifted. In FIGS. 3 and 4, the target data may be read from the source area and written to the destination area.

In FIG. 3, a second data item 324 may be a data item stored at a position where a first data item 322 is to be written. If the first data item 322 is written before the second data item 324 is read, the second data item 324 may be overwritten, causing data corruption.

In FIG. 4, a third data item 426 may be a data item stored at a position where a second data item 424 is to be written. In some cases, a read request for the first to fourth data items 422, 424, 426, and 428 in the source area is transmitted to the memory controller, but the read of the second data item 424 may be performed first before the read of the third data item 426 is actually performed. In this case, if the data is written to the destination area in the order in which the data is read, the unread third data item 426 may be overwritten by the second data item 424, causing data corruption.

A method and a system for shifting the data, which can prevent the data corruption problem described with reference to FIGS. 3 and 4 without unnecessarily consuming the bandwidth of a separate memory device in the process of shifting the data within the memory will be described with reference to FIGS. 5 to 12.

Figure 5:
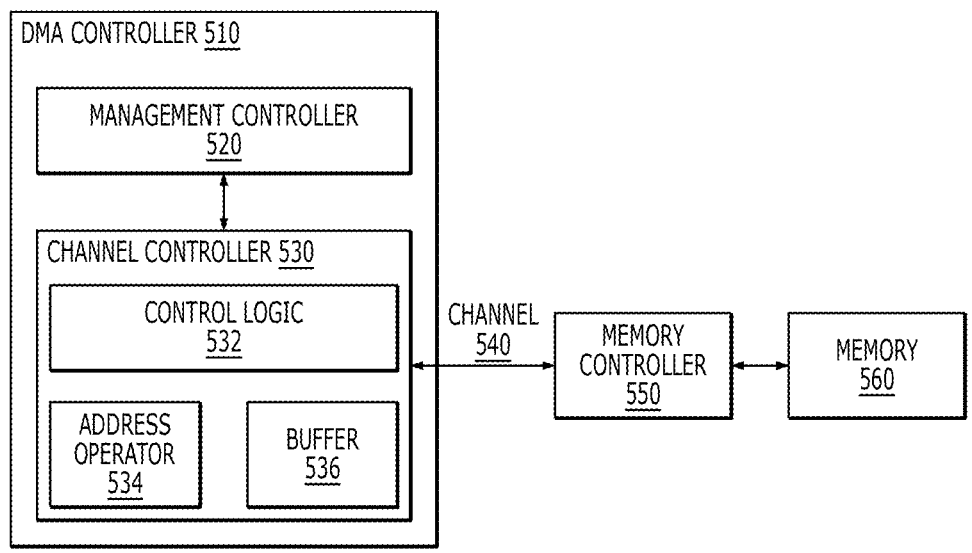
FIG. 5 is a diagram illustrating a memory system including a DMA controller.

FIG. 5 is a diagram illustrating a memory system including a DMA controller 510. The memory system may include the DMA controller 510, a memory 560, and a memory controller 550 associated with the memory 560. The memory 560 may include at least one memory. The memory controller 550 may include at least one controller corresponding to at least one memory, or may include one controller corresponding to at least one memory.

The DMA controller 510 may be connected to the memory controller 550 through a channel 540. The channel 540 may include a data channel for transmitting and receiving data, and a control channel for transmitting and receiving requests, control signals, etc.

The DMA controller 510 may include a management controller 520 and a channel controller 530.

The management controller 520 may receive a task associated with an operation of shifting the target data stored in the source area of the memory 560 to the destination area of the memory 560. The task received by the management controller 520 may include information associated with data shifting. For example, the task may include address information of the source area and address information of the destination area.

The channel controller 530 may include a control logic 532, an address operator 534, and a buffer 536. Although the control logic 532 and the address operator 534 are illustrated as separate configurations, aspects are not limited thereto, and the address operator 534 may be included in the control logic 532. The channel controller 530 may receive the target data from the memory 560 (or from the memory controller 550), and store the received target data in the destination area in the memory 560.

The management controller 520 or the control logic 532 may divide the target data into a plurality of data items, so that the DMA controller 510 shifts the target data in units of data items. For example, the control logic 532 may divide the source area into a plurality of sub-areas to divide the target data into a plurality of data items stored in the plurality of sub-areas.

The management controller 520 or the control logic 532 may determine a priority of each of the plurality of data items based on the address of the source area and the address of the destination area. The management controller 520 or the control logic 532 may determine a priority of each of the plurality of data items in response to at least a portion of the source area and at least a portion of the destination area overlapping with each other. In response to the address of the destination area being higher than the address of the source area, the control logic 532 may give a higher priority to a data item stored in a sub-area of a higher address of the plurality of sub-areas in the source area. Conversely, in response to the address of the destination area being lower than the address of the source area, the control logic 532 may give a higher priority to a data item stored in a sub-area of a lower address of the plurality of sub-areas in the source area.

The control logic 532 may generate a plurality of read requests associated with the plurality of data items. Each of the plurality of read requests may be for reading each of the plurality of data items and may include address information of the sub-area where each of the plurality of data items is stored. The address information of the sub-area may be calculated by the address operator 534.

The plurality of read requests generated in the control logic 532 may be transmitted to the memory controller 550 using the channel 540. For example, the plurality of read requests may be sequentially transmitted to the memory controller 550 according to the priority determined for each of the plurality of data items. The control logic 532 may sequentially generate a plurality of read requests according to the priority determined for each of the plurality of data items, and the read requests may be transmitted to the memory controller 550 in the order they are generated.

The control logic 532 (or the memory controller 550) may determine whether the read operation is performed in the memory 560 in response to the read request.

The memory controller 550 may transmit a plurality of data items corresponding to the plurality of read requests to the DMA controller 510 in response to receiving the plurality of read requests from the DMA controller 510. For example, the memory controller 550 may transmit the plurality of data items corresponding to the plurality of read requests to the DMA controller 510 according to the priority. Alternatively, the memory controller 550 may transmit the plurality of data items to the DMA controller 510 in an order independent of the priority of each of the plurality of data items. That is, the order in which the DMA controller 510 receives the plurality of data items may match or differ from the order according to the priority of each of the plurality of data items. The plurality of data items transmitted to the DMA controller 510 may be stored in the buffer 536 of the DMA controller 510.

The control logic 532 may generate a plurality of write requests corresponding to the plurality of data items. Each of the plurality of write requests may include address information of each of the plurality of sub-areas in the destination area where each of the plurality of data items are to be stored. The address information of the plurality of sub-areas in the destination area where the plurality of data items are to be stored may be calculated by the address operator 534.

A write request for a specific data item may be generated and transmitted while a read request for another data item is generated and transmitted. That is, a plurality of write requests and a plurality of read requests may be generated and transmitted in parallel as long as data corruption does not occur.

The plurality of write requests generated by the control logic 532 may be transmitted to the memory controller 550 using the channel 540. For example, the plurality of write requests may be sequentially transmitted to the memory controller 550 according to the priority determined for each of the plurality of data items. Each of the plurality of write requests may be transmitted to the memory controller 550 together with a corresponding data item.

The control logic 532 may sequentially generate a plurality of write requests according to the priority determined for each of the plurality of data items, and the write requests may be transmitted to the memory controller 550 in the order they are generated. For example, in response to the channel controller 530 receiving the second data item with a lower priority than the first data item before receiving the first data item, the control logic 532 may hold the generation of a write request associated with the second data item. In response to all write requests associated with data items having a higher priority than the first data item being transmitted to the memory controller 550 and in response to the channel controller 530 receiving the first data item, a write request associated with the first data item may be generated and transmitted. That is, even if the DMA controller 510 receives each of the plurality of data items in an order that does not match the priority of each of the plurality of data items, the plurality of data items may be sequentially stored in the destination area according to the determined priority. As a result, corruption of the data stored in the memory can be prevented.

The write request may be transmitted to the memory controller 550 in response to a specific condition being satisfied. In response to determining that the read is completed for the area where the data item is to be stored according to the write request, the corresponding write request may be transmitted to the memory controller 550. Alternatively, in response to determining that the area where the data item is to be stored according to the write request does not overlap with the source area, the corresponding write request may be transmitted to the memory controller 550.

In response to receiving a plurality of write requests from the DMA controller 510, the memory controller 550 may store a plurality of data items corresponding to the plurality of write requests in the destination area of the memory 560. For example, in response to sequentially receiving a plurality of write requests, the memory controller 550 may sequentially store a plurality of data items corresponding to the plurality of write requests in the destination area of memory 560 according to the priority. As a result, corruption of the data stored in the memory can be prevented when shifting the data within the memory.

The management controller 520 and the channel controller 530 are illustrated in FIG. 5 and described as being distinct from each other, but aspects are not limited thereto. For example, the operations and processes described as being performed by the management controller 520 may be performed by the channel controller 530, and the operations and processes described as being performed by the channel controller 530 may be performed by the management controller 520. Alternatively, the management controller 520 may be omitted, or the management controller 520 and the channel controller 530 may be integrally formed as one controller.

Figure 6:
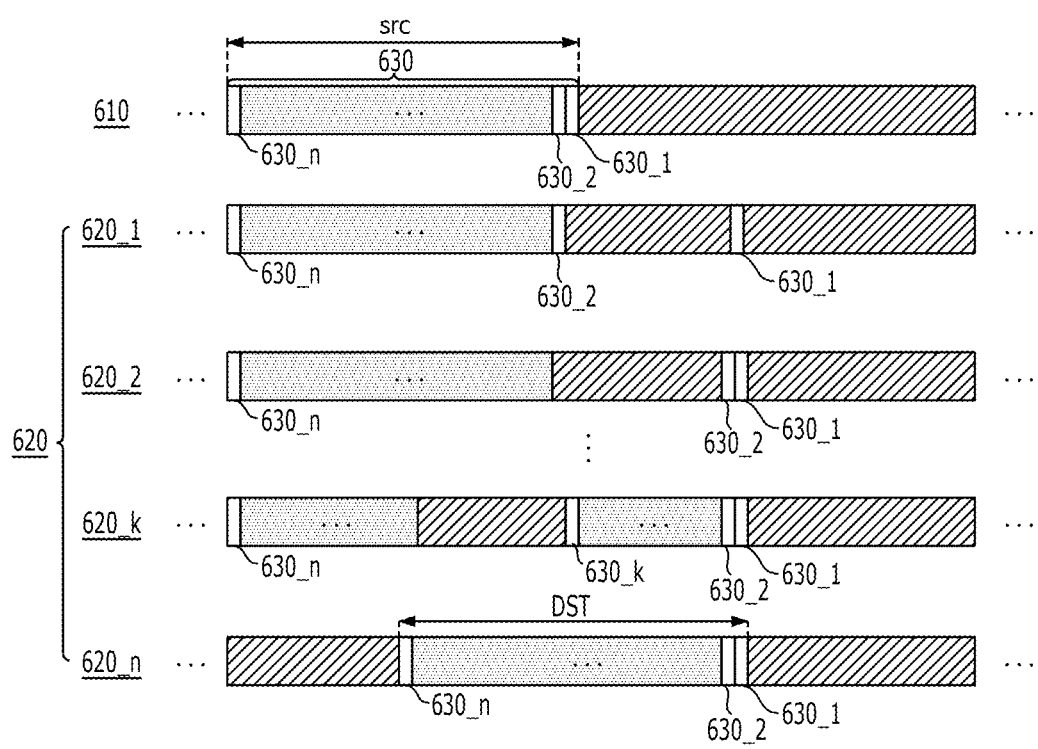
FIG. 6 is a diagram illustrating an example in which a plurality of data items are sequentially shifted.

FIG. 6 is a diagram illustrating an example in which a plurality of data items 630_1 to 630_n are sequentially shifted. Operations 610 and 620 of FIG. 6 may be performed by the DMA controller 510 of FIG. 5 based on the process described above with reference to FIG. 5. In order to shift the target data 630 from the source area "src" of the memory to the destination area "dst", the target data 630 may be divided into the plurality of data items 630_1 to 630_n (where, n is a natural number greater than or equal to 2).

The pre-operation 610 represents an example in which the target data 630 is stored in the source area of the memory before the target data 630 is shifted. In the pre-operation 610, the DMA controller may receive a task associated with an operation of shifting the target data 630 from the source area of the memory (e.g., the memory 560 of FIG. 5) to the destination area.

The shifting operation 620 represents an example in which the target data 630 is shifted to the destination area "dst" of the memory. Each of the plurality of data items 630_1 to 630_n may be sequentially shifted to the destination area by each of a plurality of sub-operations 620_1 to 620_n of the shifting operation 620.

In response to the source area and the destination area partially overlapping with each other, a priority of each of the plurality of data items 630_1 to 630_n may be determined. In response to determining that the address of the destination area is higher than the address of the source area, a higher priority may be assigned to the data item stored at a higher address. For example, since the first data item 630_1 is a data item stored in a sub-area of the highest address in the source area, the first data item 630_1 may be assigned the highest priority among the plurality of data items 630_1 to 630_n. The second data item 630_2 may be assigned a lower priority than the first data item 630_1. Conversely, since the n-th data item 630_n is a data item stored in a sub-area of the lowest address in the source area, the n-th data item 630_n may be assigned the lowest priority among the plurality of data items 630_1 to 630_n.

The first operation 620_1 of the shifting operation 620 represents an example in which the first data item 630_1 with the highest priority is shifted to the first sub-area in the destination area corresponding to the first data item 630_1. The second operation 620_2 represents an example in which the second data item 630_2 with the next highest priority after the first data item 630_1 is shifted to the second sub-area in the destination area corresponding to the second data item 630_2 after the first operation 620_1 is completed.

To generalize this, a k-th operation 620_k represents an example in which a k-th data item 630_k with a k-th priority is shifted to a k-th sub-area in the destination area corresponding to the k-th data item 630_k (where, k is equal to or greater than 2, and less than n).

If it is assumed that the sub-area on the destination area where a (k−1)th data item (not illustrated) with a (k−1)th priority is stored does not overlap with the source area, and that at least a portion of the sub-area on the destination area where the k-th data item 630_k is stored overlaps with the source area, a write request corresponding to each of the k-th data item 630_k to n-th data item 630_n may be transmitted to the memory controller in response to the completion of the read of the area where each data item is to be stored. That is, according to the assumption described above, each of the k-th data item 630_k to the n-th data item 630_n may be stored in the destination area in response to the completion of the read of the area where the data item is to be stored. Alternatively, since the area where the first data item 630_1 to (k−1)th data item are to be stored does not overlap with the source area, the data items may be stored in the destination area regardless of the completion of the read of the area where each data item is to be stored.

Figure 7:
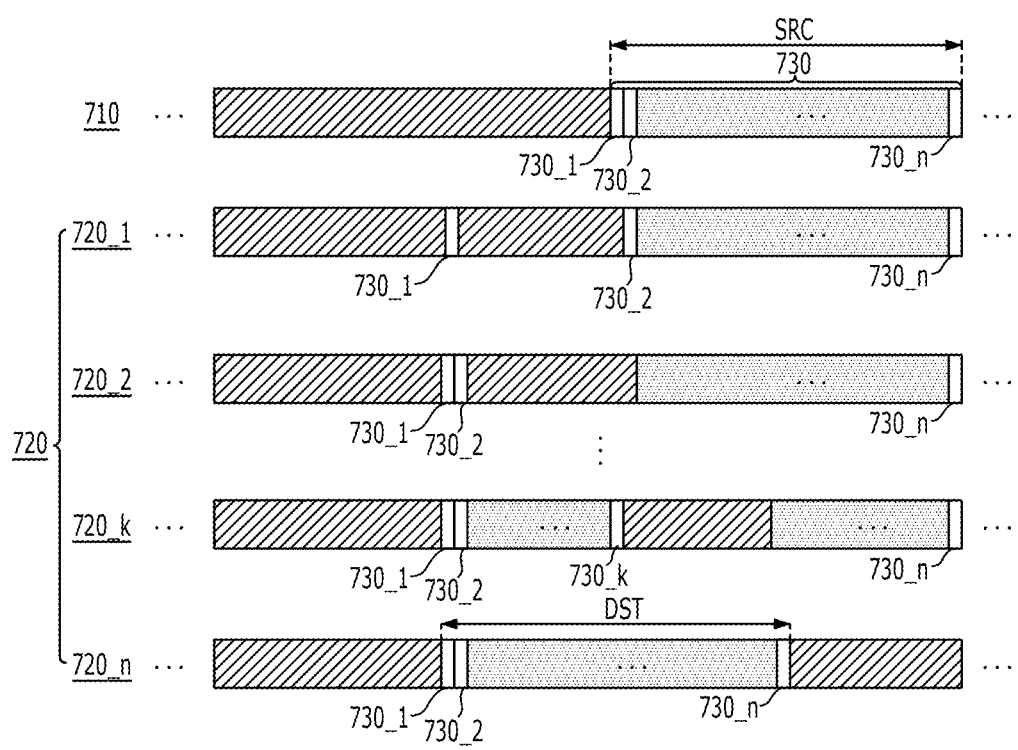
FIG. 7 is a diagram illustrating an example in which a plurality of data items are sequentially shifted.

FIG. 7 is a diagram illustrating an example in which a plurality of data items 730_1 to 730_n are sequentially shifted. Operations 710 and 720 of FIG. 7 may be performed by the DMA controller 510 of FIG. 5 based on the process described above with reference to FIG. 5. In order to shift the target data 730 from the source area "src" of the memory to the destination area "dst", the target data 730 may be divided into the plurality of data items 730_1 to 730_n (where, n is a natural number greater than or equal to 2).

The pre-operation 710 represents an example in which the target data 730 is stored in the source area of the memory before the target data 730 is shifted. In the pre-operation 710, the DMA controller may receive a task associated with an operation of shifting the target data 730 from the source area of the memory (e.g., the memory 570 of FIG. 5) to the destination area "dst".

The shifting operation 720 represents an example in which the target data 730 is shifted to the destination area "dst" of the memory. Each of the plurality of data items 730_1 to 730_n may be sequentially shifted to the destination area by each of a plurality of sub-operations 720_1 to 720_n of the shifting operation 720.

In response to the source area and the destination area partially overlapping with each other, a priority of each of the plurality of data items 730_1 to 730_n may be determined. In response to determining that the address of the destination area is lower than the address of the source area, a higher priority may be assigned to the data item stored at a lower address. For example, since the first data item 730_1 is a data item stored in a sub-area of the lowest address in the source area, the first data item 730_1 may be assigned the highest priority among the plurality of data items 730_1 to 730_n. The second data item 730_2 may be assigned a lower priority than the first data item 730_1. Conversely, since the n-th data item 730_n is a data item stored in a sub-area of the highest address in the source area, the n-th data item 730_n may be assigned the lowest priority among the plurality of data items 730_1 to 730_n.

The first operation 720_1 of the shifting operation 720 represents an example in which the first data item 730_1 with the highest priority is shifted to the first sub-area in the destination area corresponding to the first data item 730_1. The second operation 720_2 represents an example in which the second data item 730_2 with the next highest priority after the first data item 730_1 is shifted to the second sub-area in the destination area corresponding to the second data item 730_2 after the first operation 720_1 is completed.

To generalize this, a k-th operation 720_k represents an example in which a k-th data item 730_k with a k-th priority is shifted to a k-th sub-area in the destination area corresponding to the k-th data item 730_k (where, k is greater than or equal to 2, and less than n).

If it is assumed that the sub-area on the destination area where a (k−1)th data item (not illustrated) with a (k−1)th priority is stored does not overlap with the source area, and that at least a portion of the sub-area on the destination area where the k-th data item 730_k is stored overlaps with the source area, a write request corresponding to each of the k-th data item 730_k to n-th data item 730_n may be transmitted to the memory controller in response to the completion of the read of the area where each data item is to be stored. That is, according to the assumption described above, each of the k-th data item 730_k to the n-th data item 730_n may be stored in the destination area in response to the completion of the read of the area where the data item is to be stored. Alternatively, since the area where the first data item 730_1 to the (k−1)th data item are to be stored does not overlap with the source area, the data items may be stored in the destination area regardless of the completion of the read of the area where each data item is to be stored.

Figure 8:
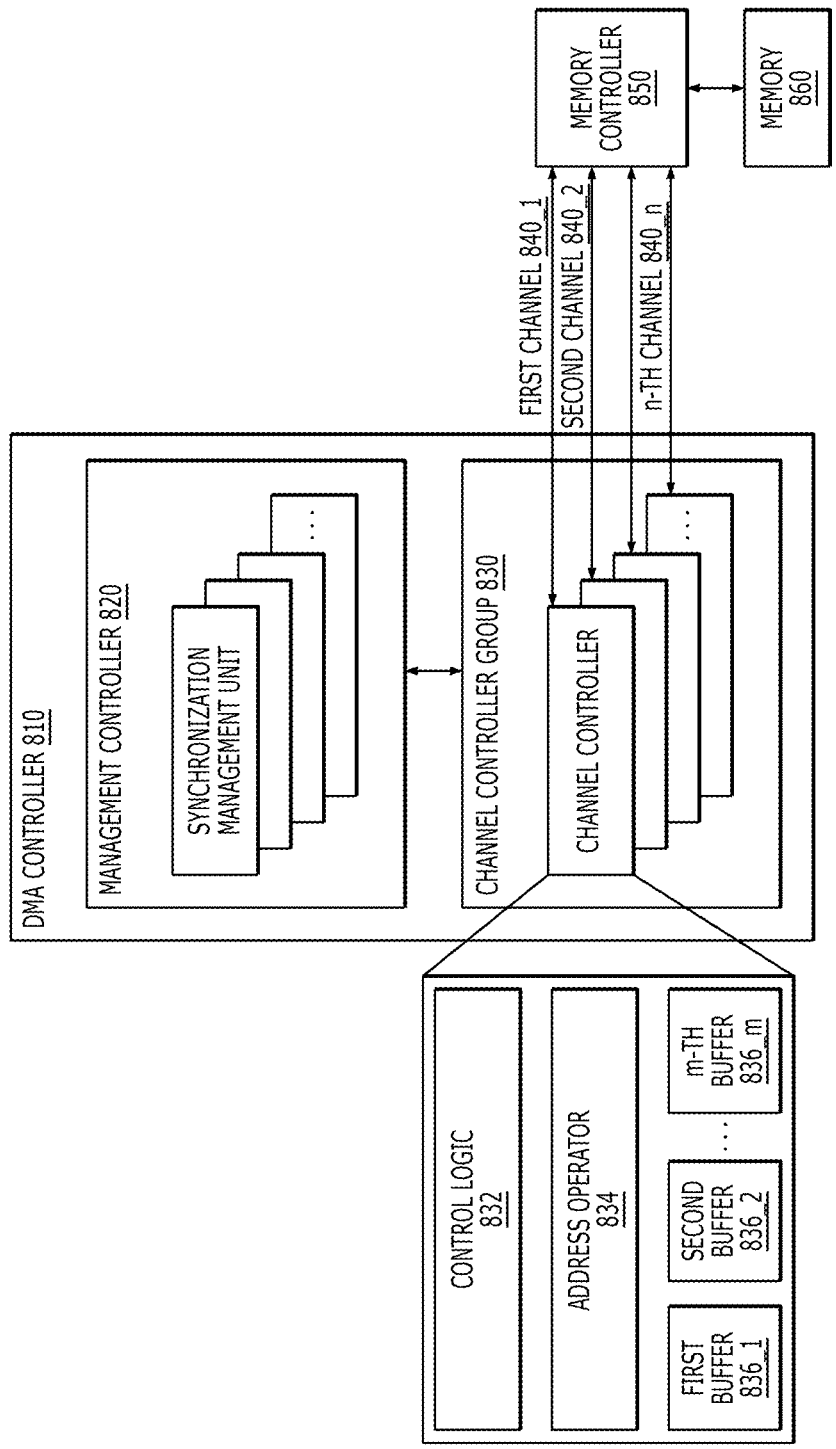
FIG. 8 is a diagram illustrating a memory system including a DMA controller.

FIG. 8 is a diagram illustrating a memory system including a DMA controller 810. The memory system may include the DMA controller 810, a memory 860, and a memory controller 850 associated with the memory 860. The memory 860 may include at least one memory. The memory controller 850 may include at least one controller corresponding to at least one memory, or may include one controller corresponding to at least one memory.

The DMA controller 810 may be connected to the memory controller 850 through a plurality of channels 840_1 to 840_n (where, n is any natural number). Each of the plurality of channels 840_1 to 840_n may include a data channel for transmitting and receiving data, and a control channel for transmitting and receiving requests or control signals, etc.

The DMA controller 810 may include a management controller 820 and a channel controller group 830. The management controller 820 may control the operation of the channel controller group 830.

The channel controller group 830 may include a plurality of channel controllers. Each of the plurality of channel controllers may be a controller associated with one of the plurality of channels 840_1 to 840_n.

Each of the plurality of channel controllers may include a control logic 832, an address operator 834, and a plurality of buffers 836_1 to 836_m (where, m is any natural number). Although the control logic 832 and the address operator 834 are illustrated as separate configurations, aspects are not limited thereto, and the address operator 834 may be included in the control logic 832. The channel controller group 830 may receive the target data from the memory 860 (or from the memory controller 850), and store the received target data in the destination area in the memory 860.

The management controller 820 may receive a task associated with an operation of shifting the target data stored in the source area of the memory 860 to the destination area of the memory 860. The task received by the management controller 820 may include information associated with data shifting. For example, the task may include address information of the source area and address information of the destination area.

Based on the received task, the management controller 820 may generate a plurality of sub-tasks associated with a plurality of operations for shifting a plurality of data chunks divided from the target data to the destination area.

The management controller 820 may group the plurality of data chunks to determine a plurality of data chunk groups each including at least one data chunk. Each of the plurality of data chunk groups may include a number of data chunks equal to or less than a predetermined maximum value. For example, the predetermined maximum value may be equal to the number of the plurality of channels 840_1 to 840_n. One or more data chunks included in each of the plurality of data chunk groups may be contiguously (or, continuously) positioned in the source area.

The management controller 820 may determine a priority of each of the plurality of data chunk groups based on the address of the source area and the address of the destination area. The priority of each of the plurality of data chunk groups may be determined in response to at least a portion of the source area and at least a portion of the destination area overlapping with each other. In one example, in response to the address of the destination area being higher than the address of the source area, the management controller 820 may give a higher priority to the data chunk group stored in the area of a higher address. Alternatively, in response to determining that the address of the destination area is lower than the address of the source area, the management controller 820 may give a higher priority to the data chunk group stored in a lower address.

The channel controller group 830 may receive and store a first group of the plurality of data chunk groups. For example, the channel controller group 830 may store one data chunk from the first group for each first buffer 836_1 of each of the plurality of channel controllers. That is, the first group may be distributed and stored in a plurality of first buffers 836_1 of the plurality of channel controllers.

Likewise, the channel controller group 830 may receive and store a second group, which is the next highest priority after the first group, of the plurality of data chunk groups. For example, the channel controller group 830 may store one data chunk from the second group for each second buffer 836_2 of each of the plurality of channel controllers. That is, the second group may be distributed and stored in a plurality of second buffers 836_2 of the plurality of channel controllers.

In response to the channel controller group 830 completing the reception of the first group, the management controller 820 may control the channel controller group 830 to receive the second group.

While the first group is written to the destination area, the second group may be read and stored in the second buffer 836_2. As a result, the read and write operations of the target data may be performed in parallel, thereby increasing the efficiency of data shifting within the memory.

The control logic 832 included in each of the plurality of channel controllers in the channel controller group 830 may generate a plurality of read requests associated with a plurality of data items included in one data chunk. The control logic 832 may transmit the plurality of generated read requests to the memory controller 850. Each of the plurality of channel controllers may receive a plurality of data items corresponding to the plurality of read requests transmitted to the memory controller 850. As a result, the channel controller group 830 may receive one data chunk group. Each of the plurality of read requests may include address information of each of the plurality of sub-areas in the source area where a plurality of data items are stored, and the address information of each of the plurality of sub-areas may be calculated by the address operator 834.

The management controller 820 may control the channel controller group 830 such that a plurality of data chunk groups are processed in sequence according to the determined priority. As the plurality of data chunk groups are processed in sequence according to the determined priority, the target data may be shifted to the destination area.

In response to completing the reception of the first group, the channel controller group 830 may initiate an operation of writing the first group to the destination area.

Whether the reception of the first group is completed or not may be determined based on whether the management controller 820 received reception completion signals from all channel controllers. For example, in response to completing the reception of the data chunk, each of the plurality of channel controllers may transmit a reception completion signal to the management controller 820. Even if there is no sub-task assigned to each of the plurality of channel controllers, each of the plurality of channel controllers may transmit a reception completion signal to the management controller 820. In response to receiving the reception completion signals from all channel controllers, the management controller 820 may determine that the reception of the first group is completed.

The reception completion signal of a specific channel controller may be received by a synchronization management unit in the management controller 820 corresponding to the corresponding channel controller. That is, in response to receiving the reception completion signals from all of the plurality of synchronization management units, it may be determined that the reception of the first group is completed.

The control logic 832 of each of the plurality of channel controllers may generate a plurality of write requests. The plurality of write requests may be requests associated with a plurality of data items to be shifted by a sub-task that is to be processed by each of the plurality of channel controllers.

The control logic 832 of each of the plurality of channel controllers may transmit the plurality of generated write requests and a plurality of data items corresponding to the plurality of write requests to the memory controller 850. Each of the plurality of write requests may include address information of a plurality of sub-areas in the destination area where the plurality of data items are to be stored. The address information of the plurality of sub-areas where the plurality of data items are to be stored may be calculated by the address operator 834 of each of the plurality of channel controllers.

The channel controller group 830 may process at least one data chunk included in each of the plurality of data chunk groups in parallel by using the plurality of channels 840_1 to 840_n. For example, the channel controller group 830 may in parallel read one or more data chunks from the source area or write the data chunks to the destination area by using the plurality of channels 840_1 to 840_n.

The management controller 820, the channel controller group 830, and the plurality of channel controllers are illustrated in FIG. 8 and described as being distinct from each other, but aspects are not limited thereto. For example, the operations and processes described as being performed by the management controller 820 may be performed by the plurality of channel controllers, and conversely, the operations and processes described as being performed by the plurality of channel controllers may be performed by the management controller 820. Alternatively, the management controller 820 may be omitted, or the management controller 820 and the plurality of channel controllers may be integrally configured as one controller.

Figure 9:
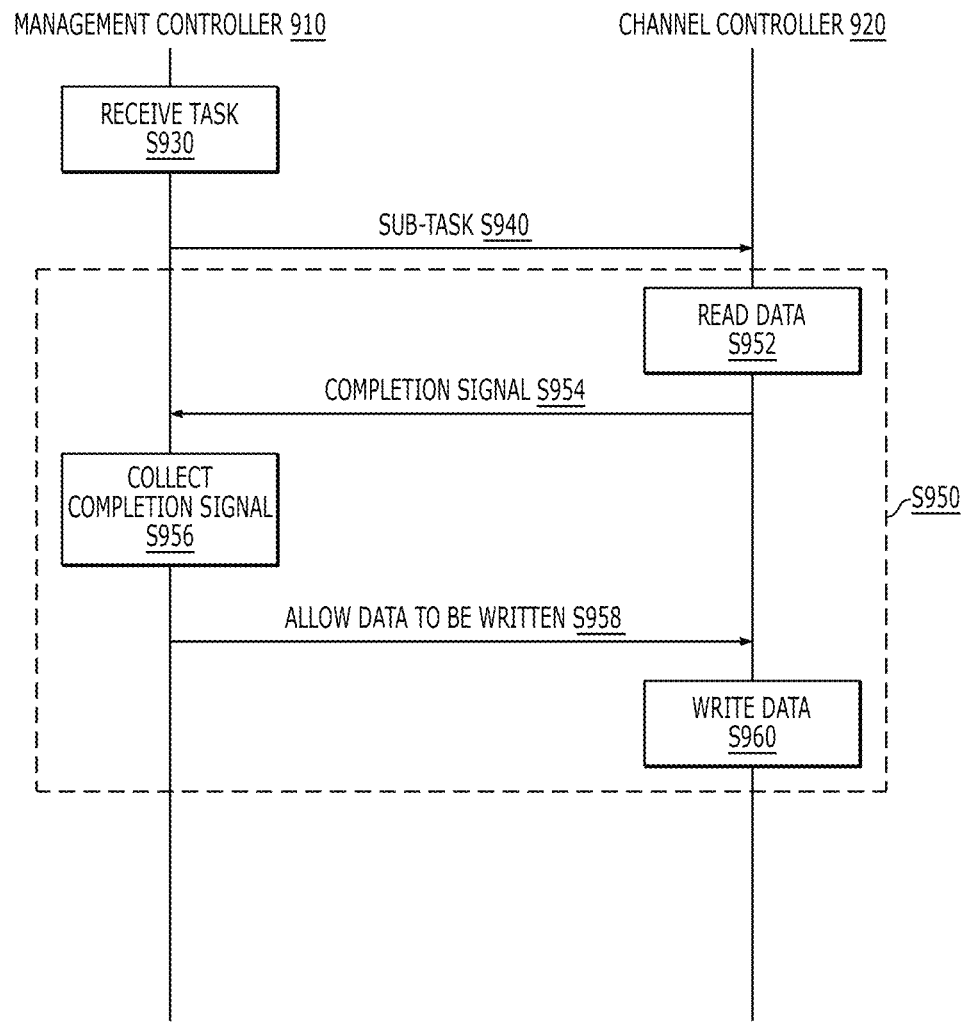
FIG. 9 is a flowchart provided to explain an example in which data shifting is performed using a management controller and a channel controller in the DMA controller.

FIG. 9 is a flowchart illustrating an example in which data shifting is performed using a management controller 910 and a channel controller 920 in the DMA controller. The management controller 910 may correspond to the management controller 820 of FIG. 8, and the channel controller 920 may correspond to one channel controller in the channel controller group 830 of FIG. 8.

The management controller 910 may receive a task associated with the operation of shifting the target data stored in the source area of the memory connected to the DMA controller to the destination area of the memory, at S930.

The management controller 910 may transmit one of a plurality of sub-tasks generated based on the task received at S930 to the channel controller 920, at S940. Each of the plurality of sub-tasks may be a task associated with the operation of shifting each of the plurality of data chunks divided from the target data to the destination area.

The management controller 910 and the channel controller 920 may shift a data chunk group including one or more data chunks to the second area, at S950. The operation S950 may be repeatedly performed until all groups are processed, and may be performed in parallel for each of the plurality of data chunk groups.

Specifically, in response to receiving the sub-task from the management controller 910, the channel controller 920 may read a data chunk (or a plurality of data items included in the data chunk) to be shifted by the sub-task, at S952.

In response to the completion of the read of the data chunk to be shifted by the sub-task, the channel controller 920 may transmit a completion signal to the management controller 910, at S954.

The management controller 910 may collect the completion signal for each of the plurality of channel controllers in the channel controller group including the channel controller 920, at S956. In response to collecting the completion signals from all channel controllers, the management controller 910 may allow the channel controller 920 (or the channel controller group including the channel controller 920) to write data, at S958.

In response to the management controller 910 allowing the writing of data, the channel controller 920 may write the read data chunk to the destination area, at S960.

The channel controller 920 may perform the operation S950 in parallel for other data chunks while performing the operation S950 for a specific data chunk. For example, the channel controller 920 may read another data chunk while writing a specific data chunk to the destination area. In this case, each of the plurality of data chunks processed in parallel may be a data chunk included in different data chunk groups. The operation S950 may be performed in parallel for any number of data chunks, with the maximum number of data chunks corresponding to the number of buffers in the channel controller 920.

The flowchart and description described above with reference to FIG. 9 are merely examples and may be implemented differently in some aspects. For example, in some aspects, the order of respective operations may be changed, some of the operations may be performed repeatedly, multiple operations may be performed simultaneously, some operations may be omitted, or some operations may be added.

Figure 10:
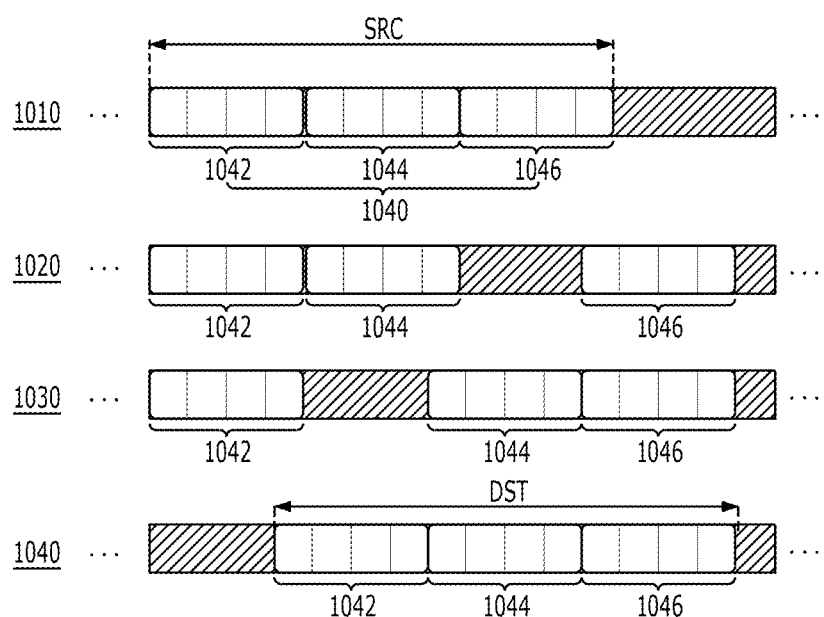
FIG. 10 is a diagram illustrating an example in which a plurality of data chunk groups are sequentially shifted.

FIG. 10 is a diagram illustrating an example in which a plurality of data chunk groups 1042, 1044, and 1046 are sequentially shifted. Operations 1010, 1020, 1030, and 1040 of FIG. 10 may be performed by the DMA controller 810 of FIG. 8 based on the process illustrated and described above with reference to FIGS. 8 and 9. In order to shift the target data 1040 from the source area "src" to the destination area "dst" of the memory, the target data 1040 may be divided into the plurality of data chunk groups 1042, 1044, and 1046 each including one or more data chunks (where, n is a natural number greater than or equal to 2). Each of the plurality of data chunk groups 1042, 1044, and 1046 may be shifted by a plurality of sub-tasks, and each of the plurality of data chunks in the data chunk group may be shifted by one sub-task.

The first operation 1010 represents an example in which the target data 1040 is stored in the source area "src" of the memory before the target data 1040 is shifted. In the first operation 1010, the DMA controller (e.g., the DMA controller 810 of FIG. 8) may receive a task associated with the operation of shifting the target data 1040 from the source area to the destination area "dst" of the memory (e.g., the memory 860 of FIG. 8).

In response to the source area and the destination area partially overlapping with each other, a priority of each of the plurality of data chunk groups 1042, 1044, and 1046 may be determined. In response to determining that the address of the destination area is higher than the address of the source area, a higher priority may be assigned to the data chunk group stored at a higher address. For example, the third data chunk group 1046 may be assigned the highest priority because it is stored at the highest address in the source area, and the first data chunk group 1042 may be assigned the lowest priority because it is stored at the lowest address in the source area.

The second operation 1020 represents an example in which the third data chunk group 1046 with the highest priority is shifted to an area in the destination area corresponding to the third data chunk group 1046. Likewise, the third operation 1030 represents an example in which the second data chunk group 1044 with the next highest priority after the third data chunk group 1046 is shifted to an area in the destination area corresponding to the second data chunk group 1044, and the fourth operation 1040 represents an example in which the first data chunk group 1042 with the next highest priority after the second data chunk group 1044 is shifted to an area in the destination area corresponding to the first data chunk group 1042.

In each operation, the DMA controller may write the corresponding data chunk group to the destination area in response to the completion of the reception of each data chunk group. As a result, data corruption caused by data shifting may be prevented.

Figure 11:
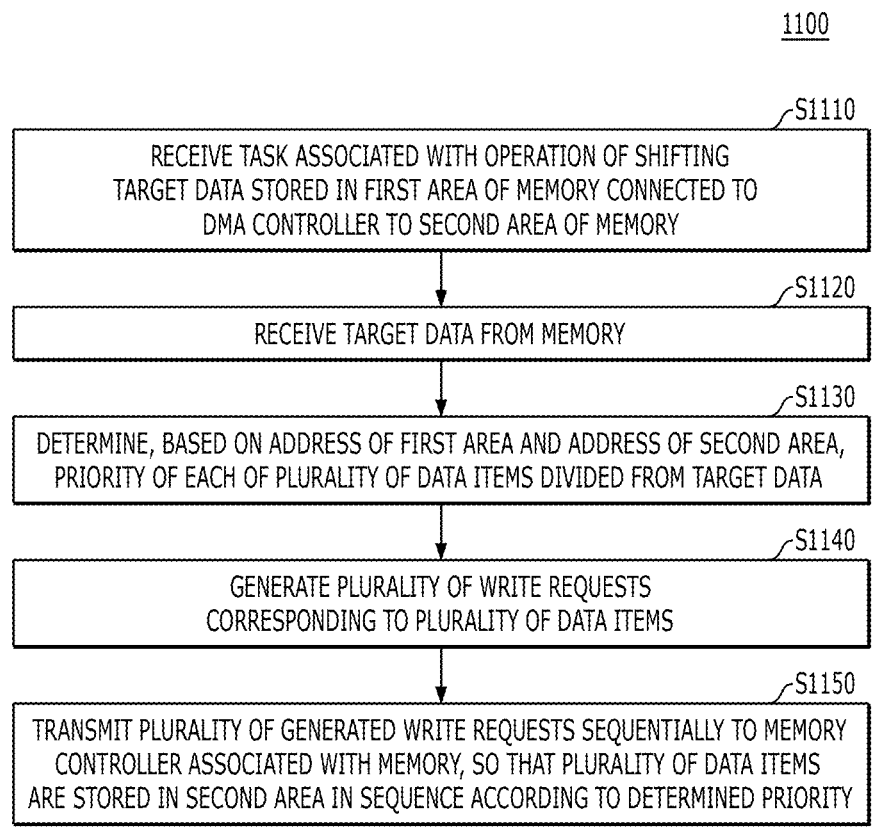
FIG. 11 is a flowchart provided to explain a method for shifting data within a memory according to some aspects.

FIG. 11 is a flowchart illustrating a method 1100 for shifting data within the memory. The method 1100 for shifting data within the memory may be performed by a direct memory access (DMA) controller (e.g., the DMA controller 510 of FIG. 5 or the DMA controller 810 of FIG. 8).

The method 1100 may be initiated by the DMA controller receiving a task associated with the operation of shifting the target data stored in a first area of the memory connected to the DMA controller to a second area of the memory, at S1110.

The DMA controller may receive the target data from the memory, at S1120. The DMA controller may generate a plurality of read requests associated with a plurality of data items. For example, the DMA controller may sequentially generate a plurality of read requests according to the priority determined at S1130. The DMA controller may calculate address information of a plurality of sub-areas in the first area where a plurality of data items are stored, and each of the plurality of read requests may include address information of each of the plurality of sub-areas.

The DMA controller may transmit the plurality of generated read requests to the memory controller and receive a plurality of data items corresponding to the plurality of read requests from the memory controller.

The DMA controller may sequentially transmit the plurality of generated read requests to the memory controller such that the plurality of data items are read from the first area according to the priority determined at S1130. In response to sequentially receiving the plurality of read requests from the DMA controller, the memory controller may sequentially transmit a plurality of data items corresponding to the plurality of read requests to the DMA controller.

The DMA controller may determine a priority of each of the plurality of data items divided from the target data based on the address of the first area and the address of the second area, at S1130. The DMA controller may determine the priority in response to at least a portion of the first area and at least a portion of the second area overlapping each other.

In one example, each of the plurality of data items may be stored in each of the plurality of sub-areas in the first area, and in response to the address of the second area being higher than the address of the first area, the DMA controller may give a higher priority to a data item stored in a sub-area of a higher address among the plurality of sub-areas. Alternatively, in response to the address of the second area being lower than the address of the first area, the DMA controller may give a higher priority to a data item stored in a sub-area of a lower address among the plurality of sub-areas.

The DMA controller may generate a plurality of write requests corresponding to the plurality of data items, at S1140. The DMA controller may sequentially generate a plurality of write requests according to the determined priority.

For example, the plurality of data items may include a first data item and a second data item with a lower priority than the first data item, and the plurality of write requests may include a first write request corresponding to the first data item and a second write request corresponding to the second data item, and the DMA controller may hold the generation of the second write request in response to receiving the second data item before receiving the first data item. The DMA controller may generate the first write request in response to all write requests associated with one or more data items having a higher priority than the first data item being transmitted to the memory controller and in response to receiving the first data item.

The DMA controller may calculate address information of a plurality of sub-areas in the second area where a plurality of data items are to be stored, and each of the plurality of write requests may include address information of each of the plurality of sub-areas.

The DMA controller may sequentially transmit the plurality of generated write requests to the memory controller associated with the memory, so that the plurality of data items are sequentially stored in the second area according to the determined priority, at S1150.

The DMA controller may transmit each of the plurality of write requests to the memory controller in response to a first condition or a second condition being satisfied. The first condition may be that the read of an area where the data item corresponding to each of the plurality of write requests is to be stored is completed, and the second condition may be that the area where the data item corresponding to each of the plurality of write requests is to be stored does not overlap with the first area.

In response to sequentially receiving the plurality of write requests from the DMA controller, the memory controller may sequentially store the plurality of data items corresponding to the plurality of write requests in the second area.

Figure 12:
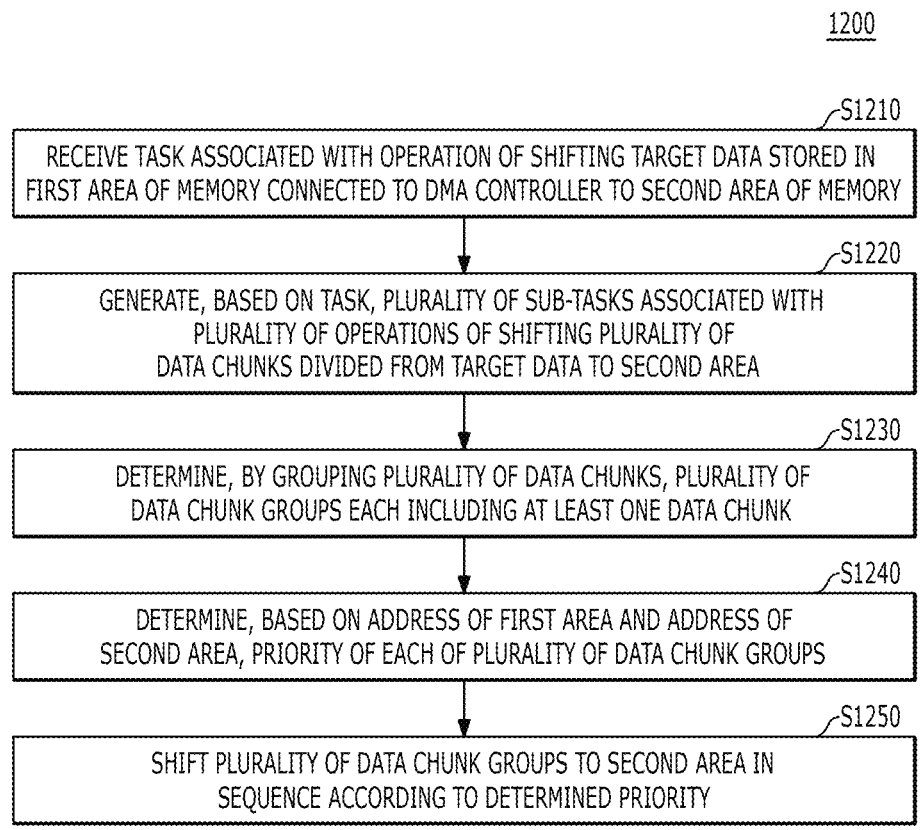
FIG. 12 is a flowchart provided to explain a method for shifting data within a memory according to other aspects.

FIG. 12 is a flowchart provided to explain a method 1200 for shifting data within the memory according to other aspects. The method 1200 for shifting data within the memory may be performed by a direct memory access (DMA) controller (e.g., the DMA controller 510 of FIG. 5 or the DMA controller 810 of FIG. 8).

The method 1200 may be initiated by the DMA controller receiving a task associated with the operation of shifting the target data stored in a first area of the memory connected to the DMA controller to a second area of the memory, at S1210.

The DMA controller may generate, based on the task, a plurality of sub-tasks associated with a plurality of operations of shifting a plurality of data chunks divided from the target data to the second area, at S1220.

The DMA controller may group the plurality of data chunks to determine a plurality of data chunk groups each including at least one data chunk, at S1230. Each of the plurality of data chunk groups may include a number of data chunks equal to or less than a predetermined maximum value. The predetermined maximum value may be equal to the number of channels connecting the memory controller and the DMA controller associated with the memory. One or more data chunks included in each of the plurality of data chunk groups may be continuously positioned in the first area.

The DMA controller may determine a priority of each of the plurality of data chunk groups based on the address of the first area and the address of the second area, at S1240. The DMA controller may determine the priority in response to at least a portion of the first area and at least a portion of the second area overlapping each other. In one example, in response to the address of the second area being higher than the address of the first area, the DMA controller may give a higher priority to a data chunk group of the plurality of data chunk groups that is stored in an area of a higher address. Alternatively, in response to the address of the second area being lower than the address of the first area, the DMA controller may give a higher priority to a data chunk group of the plurality of data chunk groups which is stored in an area of a lower address.

The DMA controller may shift the plurality of data chunk groups to the second area in sequence according to the determined priority, at S1250. By shifting the plurality of data chunk groups, the target data may be shifted to the second area.

The DMA controller may receive any one of the plurality of data chunk groups, that is, a first group, determine whether the reception of the first group is completed, and in response to determining that the reception of the first group is completed, initiate an operation of writing the first group to the second area. In response to determining that the reception of the first group is completed and that there is a second group with the next priority after the first group, the DMA controller may receive the second group.

The DMA controller may include a plurality of channel controllers, and each of the plurality of channel controllers may include a first buffer and a second buffer. The first group may be stored in a plurality of first buffers of the plurality of channel controllers, and the second group may be stored in a plurality of second buffers of the plurality of channel controllers. While the first group is written to the second area, the DMA controller may receive the second group and store the second group to the plurality of second buffers.

The DMA controller may include a management controller and a plurality of channel controllers, and each of a plurality of sub-tasks may be processed by any one of the plurality of channel controllers. The DMA controller may receive a data chunk in the first group from each of the plurality of channel controllers. In response to completing the reception of the data chunk from each of the plurality of channel controllers, the channel controller may transmit a reception completion signal to the management controller.

In response to receiving the reception completion signal from all channel controllers, the management controller may determine that the reception of the first group is completed.

The DMA controller may generate a plurality of read requests associated with a plurality of data items for shifting by each of one or more sub-tasks (or data items included in one data chunk), transmit the plurality of generated read requests to the memory controller associated with the memory, and receive a plurality of data items corresponding to the plurality of read requests from the memory controller. The DMA controller may calculate address information of a plurality of sub-areas in the first area where the plurality of data items are stored, and each of the plurality of read requests may include address information of each of the plurality of sub-areas.

The DMA controller may generate a plurality of write requests associated with a plurality of data items shifted by the sub-task and transmit the plurality of generated write requests to the memory controller through a plurality of channels. The DMA controller may calculate address information of a plurality of sub-areas in the second area where the plurality of data items are to be stored, and each of the plurality of write requests may include address information of each of the plurality of sub-areas.

The DMA controller may shift at least one data chunk included in each of the plurality of data chunk groups in parallel using the plurality of channels. For example, the DMA controller may read at least one data chunk from the first area in parallel using the plurality of channels, and write at least one data chunk to the second area in parallel using the plurality of channels.

The flowcharts and the description described above with reference to FIGS. 11 and 12 are merely examples, and may be implemented differently in some aspects. For example, in some aspects, the order of respective operations may be changed, some of the operations may be repeatedly performed, some may be omitted, or some may be added.

The method described above may be provided as a computer program stored in a computer-readable recording medium for execution on a computer. The medium may be a type of medium that continuously stores a program executable by a computer, or temporarily stores the program for execution or download. In addition, the medium may be a variety of recording means or storage means having a single piece of hardware or a combination of several pieces of hardware, and is not limited to a medium that is directly connected to any computer system, and accordingly, may be present on a network in a distributed manner. An example of the medium includes a medium configured to store program instructions, including a magnetic medium such as a hard disk, a floppy disk, and a magnetic tape, an optical medium such as a CD-ROM and a DVD, a magneto-optical medium such as a floptical disk, and ROM, RAM, flash memory, etc. In addition, other examples of the medium may include an app store that distributes applications, a site that supplies or distributes various software, and a recording medium or a storage medium managed by a server.

The methods, operations, or techniques of the present disclosure may be implemented by various means. For example, these techniques may be implemented in hardware, firmware, software, or a combination thereof. Those skilled in the art will further appreciate that various illustrative logical blocks, modules, circuits, and algorithm steps described in connection with the disclosure herein may be implemented in electronic hardware, computer software, or a combination of both. To clearly illustrate this interchangeability of hardware and software, various illustrative components, blocks, modules, circuits, and steps have been described above generally in terms of their functionality. Whether such a function is implemented as hardware or software depends on design requirements imposed on the particular application and the overall system. Those skilled in the art may implement the described functions in varying ways for each particular application, but such implementation should not be interpreted as causing a departure from the scope of the present disclosure.

In a hardware implementation, processing units used to perform the techniques may be implemented in one or more ASICs, DSPs, digital signal processing devices (DSPDs), programmable logic devices (PLDs), field programmable gate arrays (FPGAs), processors, controllers, microcontrollers, microprocessors, electronic devices, other electronic units designed to perform the functions described in the present disclosure, or a combination thereof.

Accordingly, various example logic blocks, modules, and circuits described in connection with the present disclosure may be implemented or performed with general purpose processors, DSPs, ASICs, FPGAs or other programmable logic devices, discrete gate or transistor logic, discrete hardware components, or any combination of those designed to perform the functions described herein. The general purpose processor may be a microprocessor, but in the alternative, the processor may be any related processor, controller, microcontroller, or state machine. The processor may also be implemented as a combination of computing devices, for example, a DSP and microprocessor, a plurality of microprocessors, one or more microprocessors associated with a DSP core, or any other combination of such configurations.

In the implementation using firmware and/or software, the techniques may be implemented as instructions (or, commands) stored on a computer-readable medium, such as random access memory (RAM), read-only memory (ROM), non-volatile random access memory (NVRAM), programmable read-only memory (PROM), erasable programmable read-only memory (EPROM), electrically erasable PROM (EEPROM), flash memory, compact disc (CD), magnetic or optical data storage devices, etc. The commands may be executable by at least one processor, and may cause the processor(s) to perform certain aspects of the functions described in the present disclosure.

If implemented in software, the techniques described above may be stored on a computer-readable medium as one or more commands or codes, or may be sent via a computer-readable medium. The computer-readable media include both computer storage media and communication media, including any medium that facilitates the transmission of a computer program from one place to another. The storage media may also be any available medium that may be accessible to a computer. By way of non-limiting example, such a computer-readable medium may include RAM, ROM, EEPROM, CD-ROM or other optical disk storage, magnetic disk storage or other magnetic storage devices, or any other medium that can be used to transmit or store desired program code in the form of instructions or data structures and can be accessible to a computer. In addition, any connection is properly referred to as a computer-readable medium.

For example, if the software is sent from a website, server, or other remote source using coaxial cable, fiber optic cable, twisted pair, digital subscriber line (DSL), or wireless technologies such as infrared, wireless, and microwave, coaxial cable, fiber optic cable, twisted pair, digital subscriber line, or wireless technologies such as infrared, wireless, and microwave are included within the definition of the medium. The terms "disk" and "disc" used herein include CDs, laser disks, optical disks, digital versatile discs (DVDs), floppy disks, and Blu-ray discs, where disks usually magnetically reproduce data, while discs optically reproduce data using a laser. The combinations described above should also be included within the scope of the computer-readable media.

The software module may reside in RAM memory, flash memory, ROM memory, EPROM memory, EEPROM memory, registers, hard disk, removable disk, CD-ROM, or any other form of known storage medium. An exemplary storage medium may be connected to the processor, such that the processor may read or write information from or to the storage medium. Alternatively, the storage medium may be integrated with the processor. The processor and the storage medium may be present in an ASIC. The ASIC may be present in the user terminal. Alternatively, the processor and the storage medium may be present as separate components in the user terminal.

Although the embodiments described above have been described as utilizing aspects of the currently disclosed subject matter in one or more standalone computer systems, aspects are not limited thereto, and the present disclosure may be implemented in conjunction with any computing environment, such as a network or distributed computing environment. Furthermore, the aspects of the subject matter in the present disclosure may be implemented in multiple processing chips or devices (or, apparatus), and storage may be similarly influenced across a plurality of devices. Such devices may include PCs, network servers, and portable devices.

Although the present disclosure has been described herein in connection with some embodiments, various modifications and changes can be made without departing from the scope of the present disclosure, as understood by those skilled in the art to which the present disclosure pertains. In addition, such modifications and changes should be considered within the scope of the claims appended herein.

The invention claimed is:

1. A method for shifting data within a memory, the method being performed by a direct memory access (DMA) controller and comprising:
   receiving a task that requires an operation of shifting target data stored in a first area of a memory connected to the DMA controller to a second area of the memory, wherein the second area partially overlaps with the first area;
   receiving the target data from the memory;
   determining, based on an address of the first area compared to an address of the second area, a priority from a highest priority to a lowest priority for each of a plurality of data items divided from the target data;
   generating a plurality of write requests corresponding to the plurality of data items; and
   transmitting the plurality of write requests sequentially to a memory controller associated with the memory, so that the plurality of data items are stored in the second area in sequence from the highest priority to the lowest priority according to the determined priority for each of the plurality of data items, wherein at least one data item in the plurality of data items is stored in an area that overlaps with the first area.

2. The method according to claim 1, wherein the memory controller is configured to sequentially store in the second area, in response to sequentially receiving the plurality of write requests from the DMA controller, the plurality of data items corresponding to the plurality of write requests.

3. The method according to claim 1, wherein the generating the plurality of write requests comprises sequentially generating the plurality of write requests according to the determined priority such that a first write request for a first data item with a higher priority is transmitted prior to a second write request for a second data item with a lower priority than the first data item.

4. The method according to claim 3, wherein
the generating the plurality of write requests comprises:
withholding, in response to receiving the second data item before receiving the first data item, generation of the second write request; and
generating, in response to transmitting all write requests associated with data items having higher priorities than the first data item to the memory controller and to receiving the first data item, the first write request.

5. The method according to claim 1, wherein
each of the plurality of data items is stored in a respective one of a plurality of sub-areas in the first area, and
in response to an address of the second area being higher than an address of the first area, the higher an address of a respective one sub-area of the plurality of sub-areas in the first area is, the higher priority is assigned to a data item stored in the respective one sub-area, wherein a higher address is an address further from a starting point of a memory space and a lower address is an address closer to the starting point of the memory space.

6. The method according to claim 1, wherein
each of the plurality of data items is stored in a respective one of a plurality of sub-areas in the first area, and
in response to an address of the second area being lower than an address of the first area, the lower an address of a respective one sub-area of the plurality of sub-areas in the first area is, the higher priority is assigned to a data item stored in the respective one sub-area, wherein a lower address is an address closer to a starting point of a memory space and a higher address is an address further from the starting point of the memory space.

7. The method according to claim 1, wherein
the generating the plurality of write requests comprises calculating address information of a plurality of sub-areas in the second area where the plurality of data items are to be stored, and each of the plurality of write requests comprises address information of each of the plurality of sub-areas.

8. The method according to claim 1, wherein
the transmitting the plurality of write requests comprises transmitting, in response to a first condition, each of the plurality of write requests to the memory controller,
the first condition is that a read of an area where a data item corresponding to each of the plurality of write requests is to be stored is completed.

9. The method according to claim 1, wherein the receiving the target data comprises:
generating a plurality of read requests associated with the plurality of data items;
transmitting the plurality of generated read requests to the memory controller; and
receiving the plurality of data items corresponding to the plurality of read requests from the memory controller.

10. The method according to claim 9, wherein
the transmitting the plurality of read requests comprises sequentially transmitting the plurality of generated read requests to the memory controller, so that the plurality of data items are read from the first area according to the determined priority, and
the receiving the plurality of data items comprises receiving the plurality of data items in sequence according to the determined priority.

11. The method according to claim 9, wherein the receiving the plurality of data items comprises receiving the plurality of data items in sequence independent of the priority of each of the plurality of data items.

12. The method according to claim 9, wherein the generating the plurality of read requests comprises generating the plurality of read requests in sequence according to the determined priority.

13. The method according to claim 9, wherein
the generating the plurality of read requests comprises calculating address information of a plurality of sub-areas in the first area where the plurality of data items are stored, and
each of the plurality of read requests comprises address information of each of the plurality of sub-areas.

14. A memory system, comprising:
a direct memory access (DMA) controller;
a memory connected to the DMA controller; and
a memory controller associated with the memory, wherein the DMA controller is configured to:
receive a task that requires an operation of shifting a target data stored in a first area of the memory to a second area of the memory, wherein the second area partially overlaps with the first area;
receive the target data from the memory;
determine, based on an address of the first area compared to an address of the second area, a priority from a highest priority to a lowest priority for each of a plurality of data items divided from the target data;
generate a plurality of write requests corresponding to the plurality of data items; and
transmit the plurality of generated write requests sequentially to the memory controller, so that the plurality of data items are stored in the second area in sequence from the highest priority to the lowest priority according to the determined priority for each of the plurality of data items, wherein at least one data item in the plurality of data items is stored in an area that overlaps with the first area.

15. The memory system according to claim 14, wherein the memory controller is configured to sequentially store in the second area, in response to sequentially receiving the plurality of write requests from the DMA controller, the plurality of data items corresponding to the plurality of write requests.

16. The memory system according to claim 14, wherein
each of the plurality of data items is stored in a respective one of a plurality of sub-areas in the first area, and
in response to an address of the second area being higher than an address of the first area, the higher an address of a respective one sub-area of the plurality of sub-areas in the first area is, the higher priority is assigned to a data item stored in the respective one sub-area, wherein a higher address is an address further from a starting point of a memory space and a lower address is an address closer to the starting point of the memory space.

17. The memory system according to claim 14, wherein
each of the plurality of data items is stored in a respective one of a plurality of sub-areas in the first area, and in response to an address of the second area being lower than an address of the first area, the lower an address of a respective one sub-area of the plurality of sub-areas in the first area is, the higher priority is assigned to a data item stored in the respective one sub-area, wherein a lower address is an address closer to a starting point of a memory space and a higher address is an address further from the starting point of the memory space.

18. The memory system according to claim 14, wherein the DMA controller is configured to transmit, in response to a first condition being satisfied, each of the plurality of write requests to the memory controller, the first condition is that a read of an area where a data item corresponding to each of the plurality of write requests is to be stored is completed.

* * * * *